6857 X
G. WILKINSON.
Axle-Tree.
Patented Dec. 6, 1831.
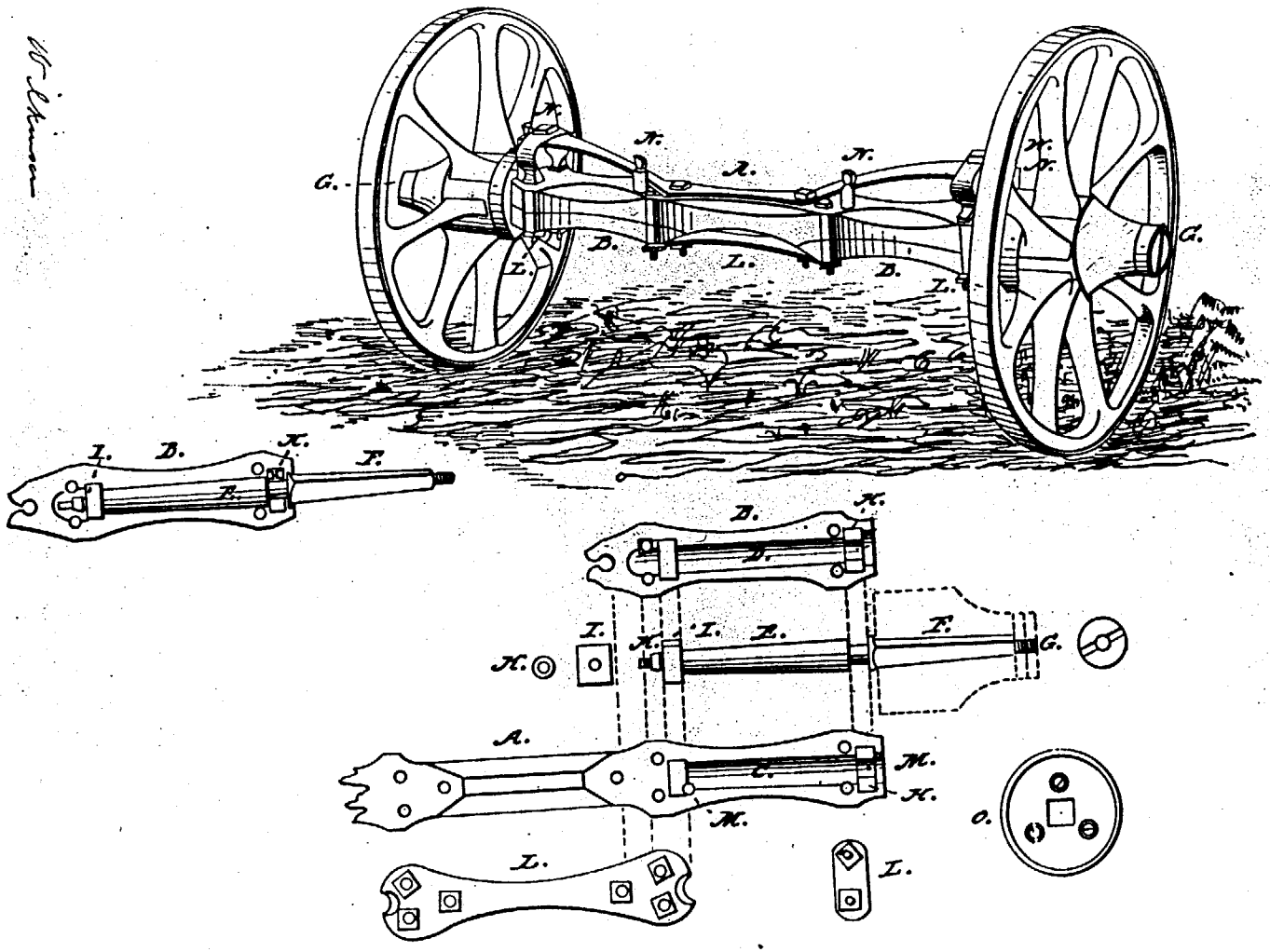
Wilkinson

X0006857 Dec 6. 1831 105

Garner Wilkinson
Letters Patent.

The Schedule referred to in these Letters Patent and making part of the same containing a description in the words of the said Garner Wilkinson himself of his improvement in the axletree hub and spokes of carriage wheels A Specification of a newly invented axletree. Arms of the Axletree. Hub and spokes for all kinds of wheel Carriages. invented by Gardner Wilkinson of the Town of White Creek, County of Washington and State of New York. First. The axletree, The axletree including the two arms that go into the Hub is in five parts. The arm is driven through the hub and does not turn in the hub. but is tight in the hub, and the wheel and arm turn together. The hub may be made of wood. brass. cast Iron, or any metal. If of wood, the arm is made four square where it goes through the hub, and is driven in from the inside of the hub and tapers, and when it passes out of the hub it extends far enough to make a screw and fit a nut on the outer end of the arm so as to make the hub fast and tight to the arm. If the hub is cast iron, brass or composed of other metal (and it may be made of any and every metal) then the hub is cast solid and then on the inside of the hub a hole is drilled from one to three inches for the arm, according to the size of the carriage. and the arm with a screw on the end is screwed tight into the hub, and to prevent it from unscrewing a brace of iron in the form of a plate of iron, or other metal is first made with a hole to admit the screw part of the arm to pass through so that when tightly screwed up the plate is tight against the hub on the outside face of the inside of the hub and the plate is to be screwed tight in that position by two or more screws fastening it to the hub. The hole is four square through the plate and so is the arm where it seats (see drawing hereunto annexed)

In the wooden hub the spokes are to be driven in solid through
to the arm and as near to the [illegible] shoulder or big end of the
hub as possible, so in the cast iron Brass, or metal hub; holes
for the spokes are to be drilled in the same place with a double
tenon and spokes are to be driven tight as before. The hub
of metal Brass or cast iron for common carriages to be three or
four inches long. The rest of the wheel to be in usual way, only
there are no boxes in the hub. Each arm is to be in length
about one third the width of the carriage from the hub or
bearing outward from the wheel. The arm is always of wrought
iron or steel, and that part extending outward from the hub
is fastened to the axletree by one double box in two parts, and
one single box. The first or double box is close to the hub and
the part of the arm turning in double Boxes is turned round
with shoulders so as to keep its place the residue of the out-
ward arm is also turned round. and the single box is on
the farther end of it confined solid in the axletree and a
screw and nut are on the end of the arm near the single
box, to keep it from drawing out of box. and the outer part
of the other beyond the hub turns in the boxes when the car-
riage moves the wheel. and the part of the arm in the hub
turning together. The axletree and the part of the arm beyond
the hub are put together with nuts and screws. The other
wheel and arm on the other end of the axletree are made
and fitted in the same way, with braces of iron or cast
steel top and bottom of axletrees. fastened to standards
of iron and axletrees put together as shown by drawings
herewith shown and delivered and hereto annexed with
tubes or globes of any metal to hold oil, or to receive oil to
oil boxes being or standing on the top or side of axle tree,
being four on each axletree and one to each Box with a screw
stopper to make them tight; in the wooden hub the spoke is
to be put with a double round tenon. The axle tree may be made of any length. of cast iron or wood or wrought iron
and in three parts without the arms. and the aforesaid drawing
shews the sections of the same with one arm attached and with
one off. The Brass cast iron or metal hubs are to be cast
with a rim projecting over the end of the axle tree as rims
usually do. The axle tree may be cast in parts of iron, brass.
or steel. and then fitted according to the drawing Exd.
November 19th 1831. [illegible]

Garner Wilkinson

Witnesses
Giles B Kellogg
Daniel Gardner (936 words)

(Granted December 6. 1831)